(12) United States Patent
Day et al.

(10) Patent No.: US 6,558,088 B1
(45) Date of Patent: May 6, 2003

(54) SECURITY CONTAINER DRILLING APPARATUS AND METHOD OF CUTTING THE LOCK BOLT OF A SECURITY CONTAINER

(75) Inventors: J. Wesley Day, Nicholasville, KY (US); Ernest M. Osborne, Lancaster, KY (US)

(73) Assignee: Lockmasters, Inc., Nicholasville, KY (US)

( * ) Notice: Subject to any disclaimer, the term of this patent is extended or adjusted under 35 U.S.C. 154(b) by 0 days.

(21) Appl. No.: 09/776,811

(22) Filed: Feb. 5, 2001

(51) Int. Cl.[7] .......................... B23B 35/00; B23B 41/00
(52) U.S. Cl. ...................... 408/1 R; 408/72 R; 408/87
(58) Field of Search ................... 408/1 R, 72 R, 408/87, 88, 115 R, 92, 103; 248/58, 71, 74.1, 300, 215, 343; 292/95

(56) References Cited

U.S. PATENT DOCUMENTS

| | | | | |
|---|---|---|---|---|
| 765,750 A | * | 7/1904 | Ott | 238/109 |
| 2,582,654 A | * | 1/1952 | Saban | 16/220 |
| 3,765,632 A | * | 10/1973 | Riggs | 248/215 |
| 4,358,229 A | * | 11/1982 | Rukes | 408/237 |
| 4,533,284 A | * | 8/1985 | Agius et al. | 408/111 |
| 4,978,257 A | | 12/1990 | Nowman | 408/111 |
| 5,462,392 A | * | 10/1995 | Hardwick | 408/110 |
| 5,984,594 A | | 11/1999 | Osborne et al. | 408/1 |

OTHER PUBLICATIONS

Random House College Dictionary, published 1980, p. 786.*

* cited by examiner

Primary Examiner—Daniel W. Howell
(74) Attorney, Agent, or Firm—Wood, Herron & Evans, L.L.P.

(57) ABSTRACT

A bolt support member for use in cutting lock bolts of security containers. The bolt support member has a hook-shaped portion at one end for engaging a lock bolt, and threaded portion at another end. The hook-shaped portion is inserted into a hole in the container near the lock bolt and is clamped between the lock bolt and the surface of the container by a pair of knobs positioned on the threaded portion of the bolt support member. The bolt support member constrains the lock bolt from bending under cutting pressure and thus prevents binding against the cutter.

10 Claims, 4 Drawing Sheets

SECURITY CONTAINER DRILLING APPARATUS AND METHOD OF CUTTING THE LOCK BOLT OF A SECURITY CONTAINER

FIELD OF THE INVENTION

The present invention pertains to devices for gaining access to security containers, and more particularly to devices that can be used to cut a lock bolt of a security container.

BACKGROUND OF THE INVENTION

Various types of security containers are used for such purposes as storing confidential or sensitive documents, valuables, and the like. Typical of such security containers are secure filing cabinets having combination locks to prevent unauthorized access. Occasionally, it becomes necessary to gain access to such containers by use of force, such as by drilling the lock bolt, usually when the combination has been lost or when the lock mechanism has malfunctioned.

The use of a power drill to gain access to a locked security container is known in the art. U.S. Pat. No. 5,984,594 describes an apparatus and method for drilling a small hole near the lock mechanism to allow a locksmith to observe the inner workings of the lock. Drilling into the lock itself is generally undesirable due to the considerable expense involved in repairing or replacing the lock. Therefore, it is preferable to gain access to and cut the lock bolts of such a container. Typically, a carbide-tipped hole-saw is used to cut through a front surface of the container, such as the front surface of a drawer, and then through the lock bolts behind the front surface. Often these lock bolts are formed from one-inch diameter cylindrical rods of hardened steel. Because the lock bolts are generally supported only near their ends, they tend to bind against a hole-saw under the considerable pressure required to cut through them. This binding generates excessive heat and tool chatter which can damage the carbide tips of a hole-saw and makes cutting the bolts difficult.

Referring to FIGS. 1 and 2, the prior art method of cutting a lock bolt will now be described. FIG. 1 shows a security container 10, in the form of a secure filing cabinet, with access drawer 12 that can be secured in a closed position by a pair of lock bolts 14 and 16. In a closed and locked state, ends 18 and 20 of lock bolts 14 and 16 engage apertures 19 and 21 in container 10 that are adapted to receive the lock bolts and prevent opening of the drawer. A combination dial 22 is used to actuate a locking mechanism 24 to provide an unlocked state, whereby lock bolts 14 and 16 may be retracted from the container apertures by actuation of a lever 26, or alternatively by rotation of the dial 22.

In the event that lock mechanism 24 has malfunctioned or the combination has been lost, entry into container 10 is often obtained by cutting lock bolts 14 and 16 using a carbide-tipped hole saw 28. Typically, the hole-saw 28 is advanced through a front panel 29 of drawer 12, creating panel hole 57, and subsequently through lock bolt 14 by using a drill rig 30. A typical drill rig used for such purposes is the MAG457100 Bullet Rig and L2021 Tower Assembly, available from Lockmasters, Inc. A drill plate 32 is fastened to drawer panel 29 in a location near lock bolt 14 using self-tapping screws 34. Stand-offs 36 support a flanged mounting plate 38 secured by cap screws 40. A first tube 42 has internal threads (not shown) and is slidably attached to the flanged mounting plate 38 by a quick-release locking collar 44. Detents 46 on the first tube 42 engage the locking collar 44 to lock first tube 42 in place at various positions along the axial length of the tube.

A second tube 48 is fitted inside first tube 42 and has external threads (not shown) which operatively engage the internal threads of the first tube 42 such that the second tube can be advanced or retracted axially along first tube 42 by manual operation of a wheel 50 fixed to the end of second tube 48. A freely rotating spindle 52 is positioned in the bore of second tube 48 and has a tool chuck 54 fixed to one end for holding hole saw 28. The spindle 52 is fixed axially relative to the second tube 48 by thrust bearings (not shown) so that the spindle 52 moves with the second tube 48 as wheel 50 is manipulated. A driven end 56 of spindle 52 is adapted to receive a driver whereby spindle 52 may be rotated using a power drill (not shown).

According to the prior art method of cutting lock bolt 14, drill plate 32 is attached to drawer panel 29 generally near lock bolt 14 and drill rig 30 is secured to drill plate 32. Locking collar 44 is manipulated to allow first tube 42 to be adjusted such that hole-saw 28 is adjacent the surface of the drawer panel 29. A power drill with an appropriate driver is fitted to the driven end 56 of spindle 52 and the drill is energized to rotate the spindle 52 and hole-saw 28 while being advanced through the surface of drawer panel 29 and subsequently through lock bolt 14 by hand manipulation of wheel 50. A typical security container utilizes at least two lock bolts, operating in tandem, thus the prior art method stated above must generally be repeated on the second lock bolt 16 before access to the drawer can be gained.

FIG. 2 shows a partial section view of the prior art cutting method of FIG. 1 taken along line 2—2. Hole-saw 28 has penetrated the surface of drawer panel 29 and has advanced part way through lock bolt 14. As depicted in FIG. 2, lock bolt 14 is substantially unsupported along its length and the cutting force applied by hole-saw 28 causes lock bolt 14 to bend in a direction away from the hole-saw 28. The bending of lock bolt 14 in turn causes ends 58 of groove 60, cut into lock bolt 14, to pinch against hole-saw 28, binding the hole-saw from rotation and damaging the carbide tips.

Accordingly, there is a need for an apparatus and methods for drilling through the lock bolt of a security container without the typical binding action which creates the various problems discussed above.

SUMMARY OF THE INVENTION

The present invention provides a method and apparatus for supporting a lock bolt of a security container while the lock bolt is being cut with a hole-saw to gain access to the container. The invention provides various advantages over previous methods and apparatus for cutting such lock bolts by constraining the lock bolt from bending and binding against the cutter. For example, the present invention reduces heat generation and tool chatter. The invention thus provides more efficient cutting and extends the service life of the cutter.

In one aspect of the present invention, a lock bolt support member has an engagement portion shaped to engage the surface of a lock bolt for a security container. The engagement portion of the support member may be inserted through an access hole that has been formed in a surface of the security container, near the lock bolt. A connecting portion of the support member remains outside the security container and mates with a locking mechanism such that the support member may be clamped between the lock bolt and the surface of the security container, thereby preventing the lock bolt from moving while it is being cut.

In another aspect of the invention, the engagement portion of the lock bolt support member is generally hook-shaped.

In another aspect of the invention, the connecting portion of the lock bolt support member includes screw threads. Accordingly the locking mechanism includes a first nut with screw threads that operatively engage the threads of the connecting portion. The locking mechanism thus can be adjusted with respect to the connecting portion so that the bolt support member can be clamped against the surface of the security container.

In yet another aspect of the invention, the locking mechanism includes a second nut with screw threads that operatively engage the threads on the connecting portion of the bolt support member such that the first nut is tightened to secure the lock bolt support member in position relative to the lock bolt and the second nut is tightened to retain the first nut from loosening.

In a further aspect of the invention, the first and second nuts of the locking mechanism comprise knobs that can be manually manipulated.

In yet another aspect of the invention, a method for cutting a lock bolt concealed behind a panel of a security container includes forming a hole in the panel near the lock bolt, inserting a lock bolt support member through the hole, supporting at least one side of the lock bolt with the lock bolt support member, cutting the lock bolt with a cutting tool that is forced against the lock bolt, and inhibiting movement of the lock bolt in a direction away from the cutter using the lock bolt support member while the lock bolt is being cut.

These and other advantages, objectives and features of the invention will become more readily apparent to those of ordinary skill upon review of the following detailed description of an illustrative embodiment of the invention.

DETAILED DESCRIPTION OF THE PREFERRED EMBODIMENT

Figure 3:
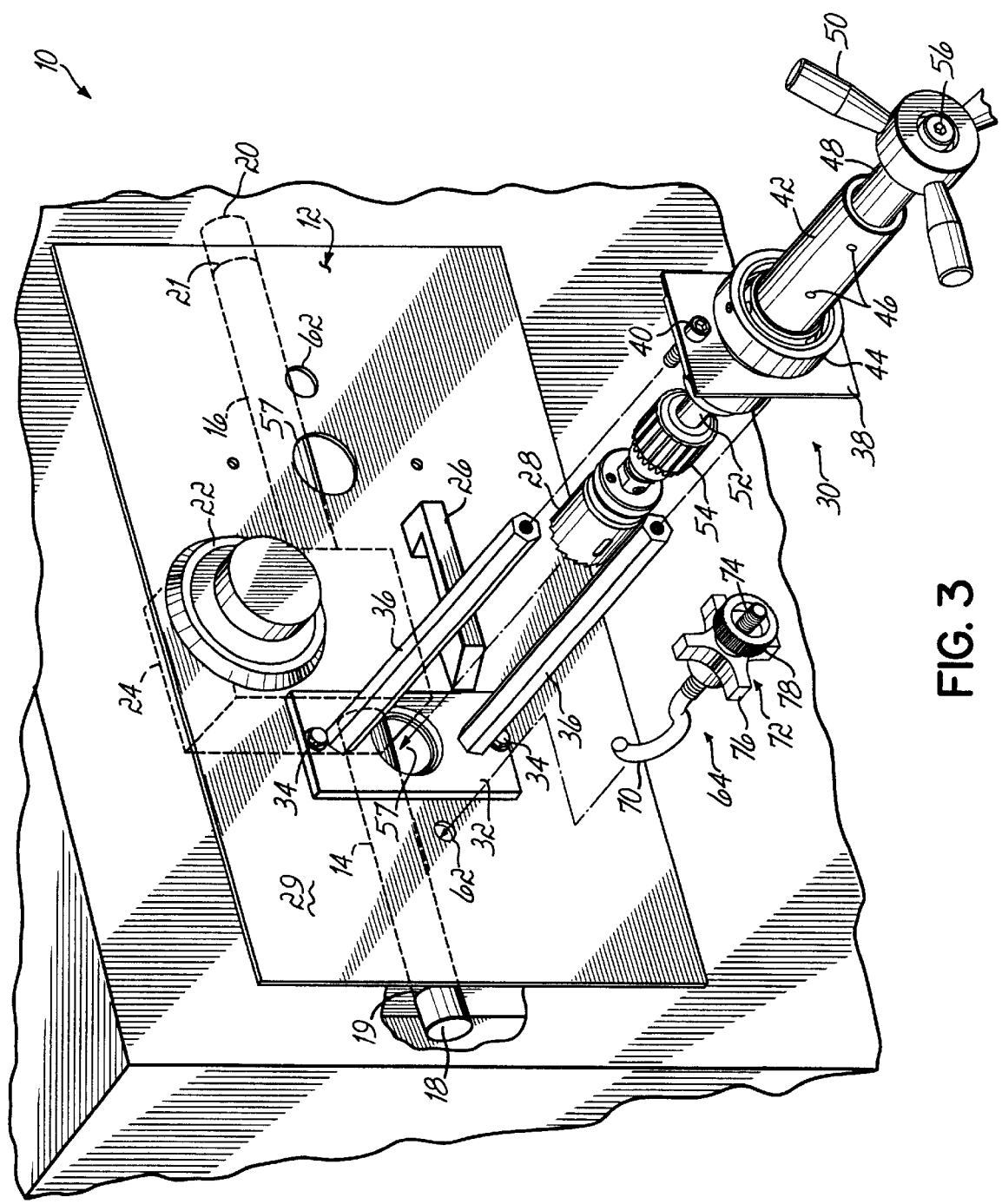
FIG. 3 is an exploded perspective view showing a preferred embodiment of the invention and its use in cutting a lock bolt of a security container.
Figure 4:
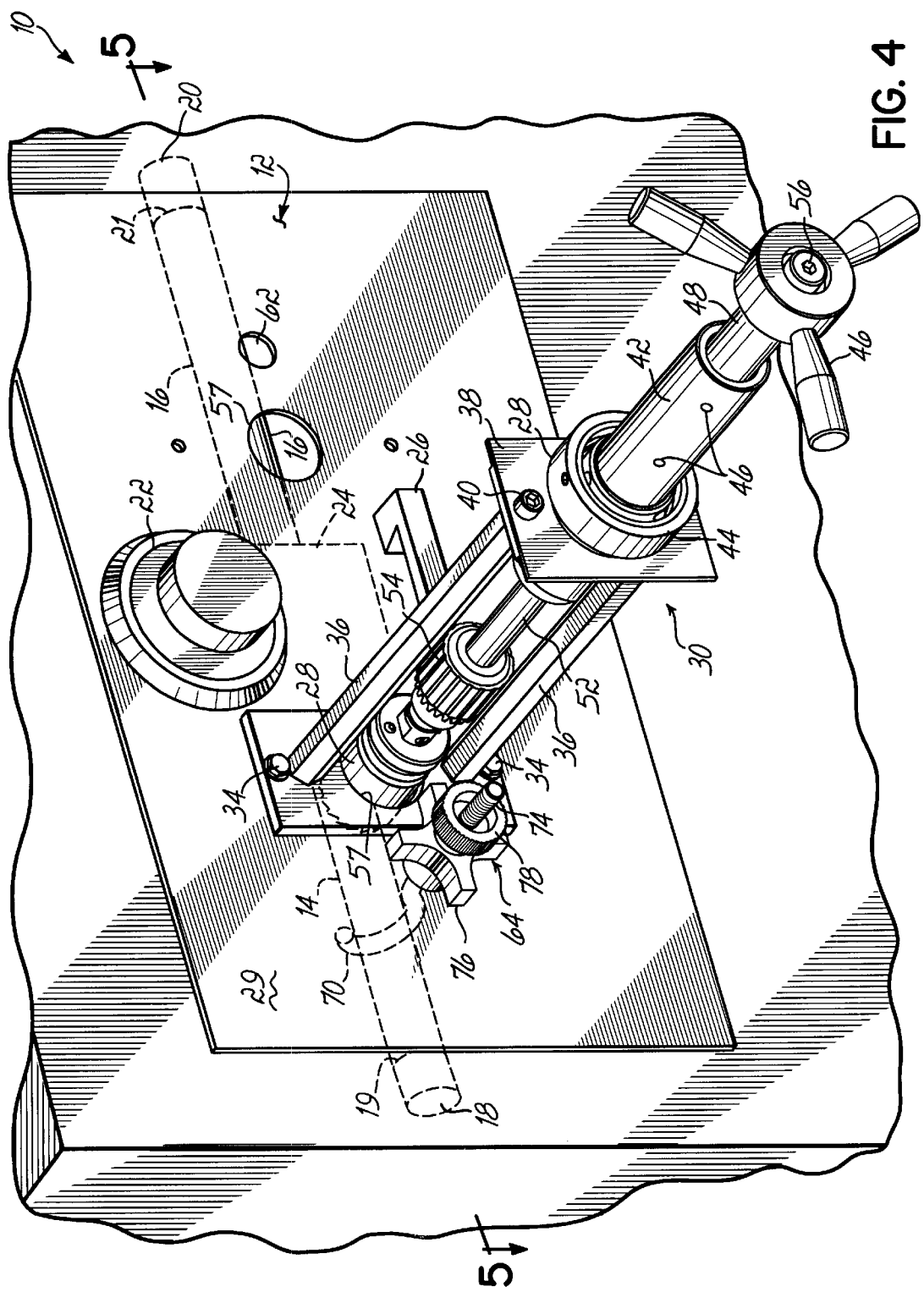
FIG. 4 depicts the devices of FIG. 3 as installed on a security container.

Referring to FIGS. 3 and 4, a security container 10 has an access drawer 12 with a drawer panel 29, lock bolts 14 and 16 with distal ends 18 and 20 that engage apertures 19 and 21, dial combination lock 22, lock mechanism 24, and lever 26 that operate as described above in the background section of this application. The present invention solves the problems associated with lock bolt bending and subsequent binding against a cutter by constraining the lock bolt from bending while being cut. As shown in FIGS. 3–6, a preferred embodiment of the present invention involves the use a drill rig 30 and a hole-saw 28 as described in the background section.

According to the invention, a lock bolt access hole 62 is cut into drawer panel 29 of the security container 10 proximate lock bolt 14 and adjacent to the location where the lock bolt 14 is to be cut. A bolt support member 64 is inserted through access hole 62 and manipulated to engage lock bolt 14. The bolt support member 64 is then secured between drawer panel 29 and lock bolt 14 to constrain movement of the lock bolt. A drill plate 32 is attached to drawer panel 29 at the desired cutting location and a drill rig 30 is fixed to drill plate 32 to complete preparations for cutting the bolt as shown in FIG. 4.

To cut the lock bolt 14, a drill with an appropriate driver (not shown) is fitted to the driven end 56 of spindle 52 on drill rig 30, the drill is energized to rotate spindle 52 and hole-saw 28, and wheel 50 is turned to advance hole-saw 28 through drawer panel 29, creating panel hole 57, and subsequently through lock bolt 14.

Figure 1:
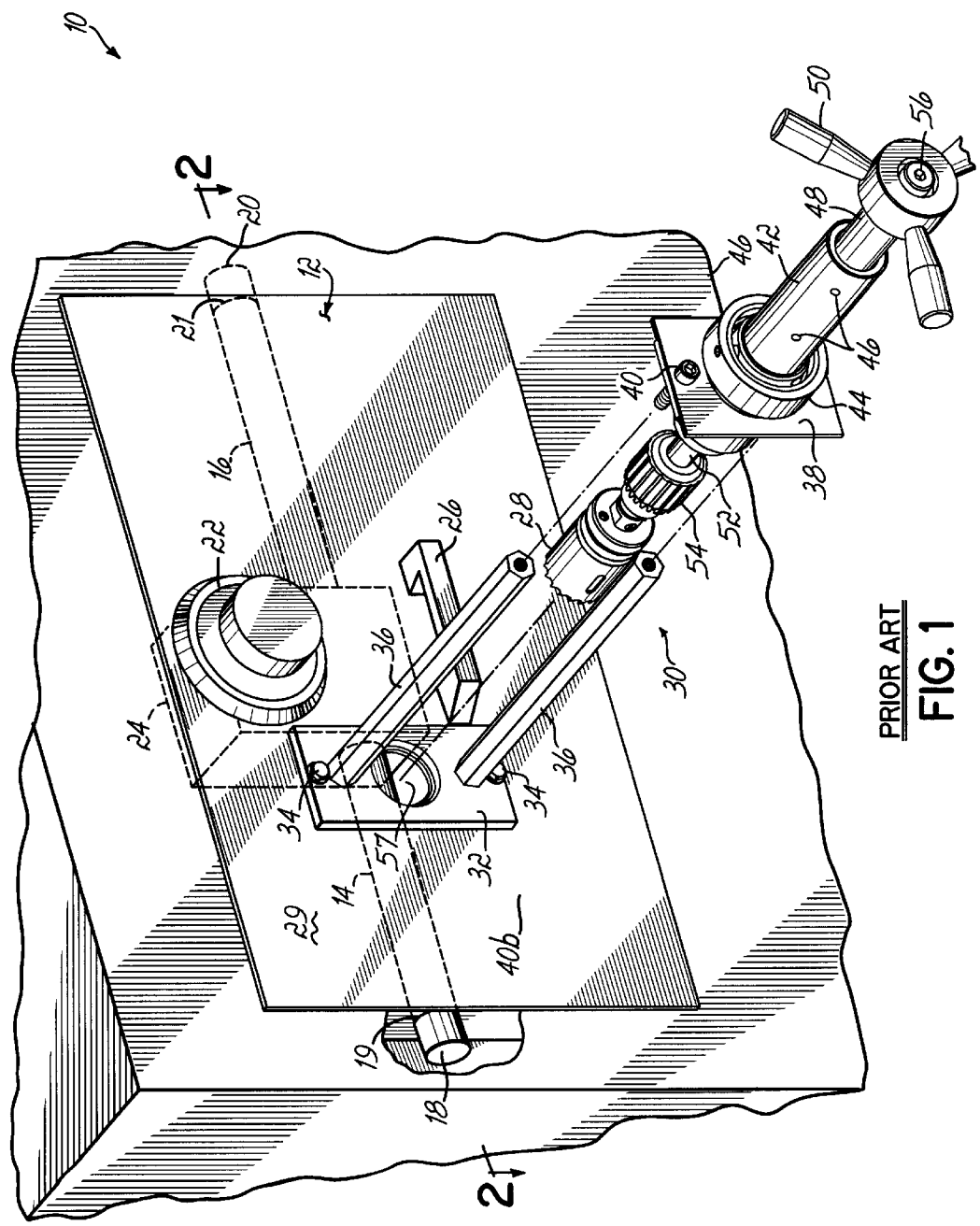
FIG. 1 is an exploded perspective view of a prior art apparatus and method for cutting a lock bolt of a security container.
Figure 2:
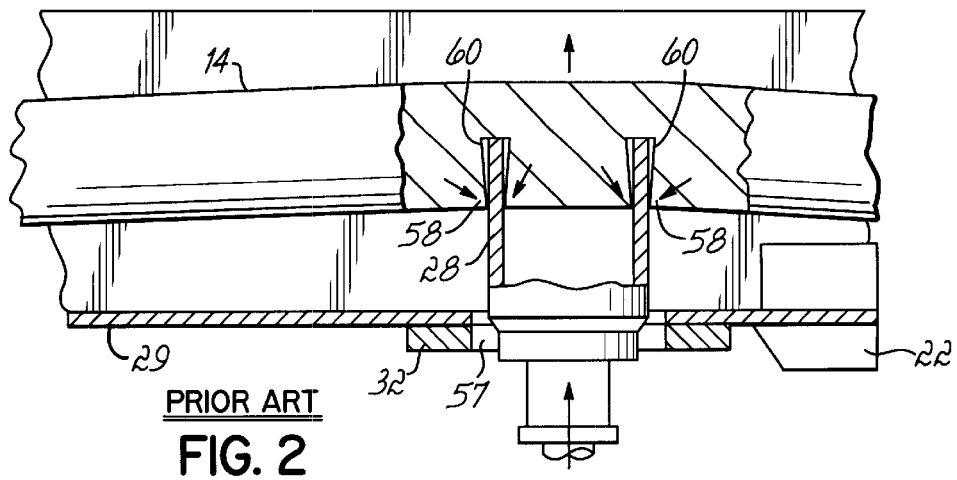
FIG. 2 is a partial section view of the security container of FIG. 1 taken along line 2—2.
Figure 5:
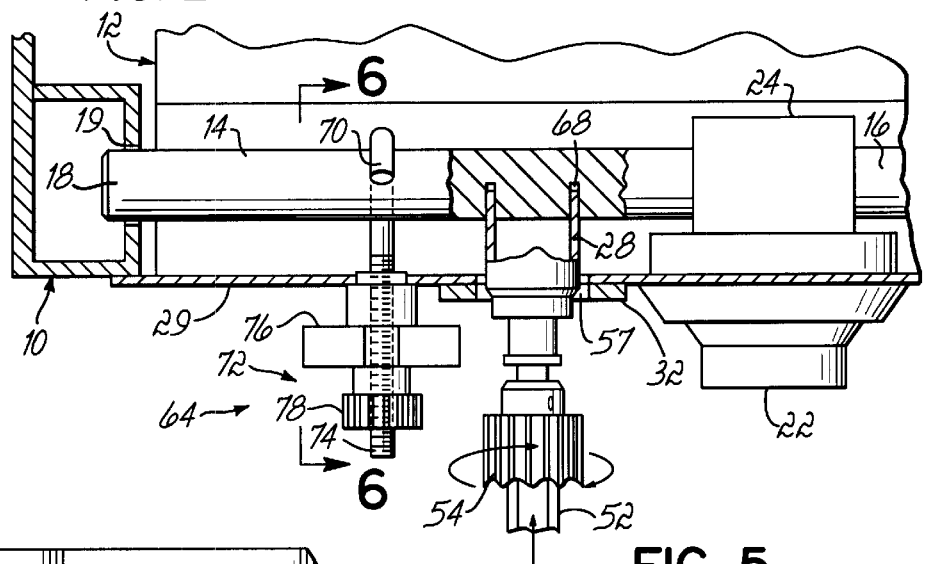
FIG. 5 is a partial cross-section view of the security container of FIG. 4 taken along lines 5—5.
Figure 6:
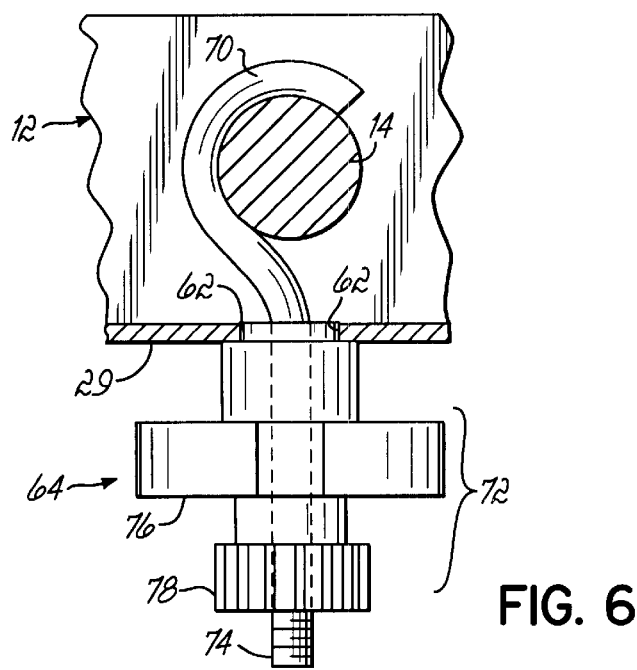
FIG. 6 is a partial cross-section view of the security container of FIG. 5 taken along line 6—6.

FIG. 5 shows a partial section view of the security container of FIG. 4 taken along line 5—5 and depicting the lock bolt 14 being cut according to the present invention. As seen in FIG. 5, the bolt support member 64 provides additional constraint of lock bolt 14 between the container aperture 19 and the lock mechanism 24, particularly in the vicinity where lock bolt 14 is being cut by hole-saw 28. The bolt support member 64 thereby inhibits bending of lock bolt 14 under the cutting force of hole-saw 28, which in turn prevents the edges of cut groove 68 from binding against the hole-saw 28. Since lock bolt 14 does not bend or bind against the hole-saw 28, heat generation and tool chatter are reduced over the prior art method of cutting a lock bolt. These benefits provide more efficient cutting of the lock bolt 14 and for increased service life of the hole-saw 28.

In this example there are two lock bolts; therefore the process embodied by the invention must be repeated with respect to lock bolt 16 in order to provide access to security container 10. Consequently, other security containers may have more or fewer lock bolts and it will be appreciated that each independent lock bolt of a security container must be cut before the container can be opened.

Referring to FIG. 3–6, a preferred embodiment of the bolt support member 64 of the present invention includes a bolt engagement portion 70 that is generally hook-shaped for engaging the circumference of an elongated cylindrical lock bolt 14. Bolt support member 64 also has locking structure 72 that extends outside the security container drawer 12 after the bolt engagement portion 70 has been inserted through access hole 62 to engage the lock bolt 14. In a preferred embodiment, the bolt locking structure 72 includes a threaded shank 74 and a first threaded nut 76 operatively disposed on the threaded shank 74. In a more preferred embodiment, locking structure 72 further includes a second threaded nut 78 operatively disposed on the threaded shank 74, adjacent the first nut 76. In an even more preferred embodiment, the first and second nuts 76 and 78 are configured to allow hand tightening of the nuts on the threaded shank 74.

A preferred method for using the bolt support member 64 of the present invention to cut the lock bolt 14 of a security container 10 involves forming an access hole 62 in a drawer panel 29 of a security container 10, inserting the bolt support member 64 through the access hole 62, manipulating the bolt support member 64 to engage lock bolt 14, tightening a first nut 76 against the surface of drawer panel 29 to secure lock bolt 14 in position, tightening a second nut 78 against the first nut 76 to retain the first nut 76 in place, and cutting lock bolt 14 using a hole-saw 28 held in a drilling rig 30.

While the present invention has been illustrated by a description of preferred embodiments and while the embodiments have been described in considerable detail, it is not the intention of the Applicant to restrict or in any way limit the scope of the appended claims to such detail. Additional advantages, modifications and adaptations of this invention will become apparent to those skilled in the art upon reviewing this disclosure. The invention in its broader aspects is therefore not limited to the specific details, representative apparatus and method as shown and described.

The invention itself should only be defined by the appended claims, wherein we claim:

1. Apparatus for cutting through a lock bolt of a security container with a tool and for stabilizing the lock bolt during cutting, the lock bolt being concealed behind a panel and in an interior space of a security container, the apparatus comprising:

a cutting tool supporting system configured to be releasably attached to the panel of the security container and to support and allow advancement of the cutting tool against the lock bolt;

a lock bolt supporting member configured to be introduced through a hole in the panel and having a lock bolt engagement portion configured for disposition on at least a first side of the lock bolt and connecting structure configured to extend outwardly from a front surface of the panel, and locking structure engageable with said connecting structure and operable to hold said bolt supporting member in said interior space adjacent the lock bolt to inhibit movement of the lock bolt away from the tool as the lock bolt is cut by forcing the tool against the lock bolt from outside the security container.

2. The apparatus of claim 1, wherein the lock bolt engagement portion is generally hook-shaped.

3. The apparatus of claim 2, wherein the connecting structure includes threads.

4. The apparatus of claim 3, wherein the locking structure includes at least a first threaded member engageable with the threads of said connecting structure.

5. The apparatus of claim 4 further comprising a second threaded member engageable with the threads on said connecting structure, wherein said first threaded member is used to secure the lock bolt supporting member in position relative to the lock bolt and the second threaded member is used to retain the first threaded member in place.

6. The apparatus of claim 5, wherein said first and second threaded members each comprise knobs capable of being manually tightened against the panel.

7. A method of cutting through a lock bolt concealed behind a panel of a security container, the method comprising:

forming a hole in the panel generally adjacent the lock bolt, inserting a lock bolt supporting member through the hole, supporting at least a first side of the lock bolt with the lock bolt supporting member, cutting the lock bolt by forcing a cutting tool against the lock bolt in a direction generally toward the first side, and inhibiting movement of the lock bolt in said direction using the lock bolt supporting member while cutting the lock bolt.

8. The method of claim 7 wherein the lock bolt supporting member includes connecting structure with threads, and locking structure with a first threaded member engageable with the threads of the connecting structure, and wherein movement of the lock bolt is inhibited by tightening the first threaded member against the panel to secure the lock bolt supporting member in position.

9. The method of claim 8 wherein the locking structure further includes a second threaded member engageable with the threads of the connecting structure, the method further comprising:

retaining the first threaded member relative to the connecting structure by tightening the second threaded member against the first threaded member.

10. The apparatus of claim 1 further comprising said security container and wherein said cutting tool supporting system and said lock bolt supporting member are attached to the panel of said security container.

\* \* \* \* \*